(12) United States Patent
Lee et al.

(10) Patent No.: US 8,384,844 B2
(45) Date of Patent: Feb. 26, 2013

(54) FLAT DISPLAY PANELS, METHODS AND APPARATUSES TO REPAIR THE SAME

(75) Inventors: Sung Jin Lee, Hwaseong-si (KR); Jun Ho Lee, Yongin-si (KR); Gi Cheon Yoon, Seongnam-si (KR)

(73) Assignee: Samsung Electronics Co., Ltd., Gyeonngi-Do (KR)

(*) Notice: Subject to any disclaimer, the term of this patent is extended or adjusted under 35 U.S.C. 154(b) by 347 days.

(21) Appl. No.: 12/662,080

(22) Filed: Mar. 30, 2010

(65) Prior Publication Data
US 2010/0253877 A1  Oct. 7, 2010

(30) Foreign Application Priority Data

Apr. 6, 2009 (KR) ................ 10-2009-0029225

(51) Int. Cl.
*G02F 1/1335* (2006.01)

(52) U.S. Cl. ............... 349/62; 349/56; 349/61; 349/84; 349/139; 349/143

(58) Field of Classification Search ............. 349/56, 349/61, 62, 84, 139, 143
See application file for complete search history.

(56) References Cited

U.S. PATENT DOCUMENTS

| | | | | |
|---|---|---|---|---|
| 5,267,066 A | * | 11/1993 | Nakai et al. | 349/110 |
| 6,628,355 B1 | * | 9/2003 | Takahara | 349/106 |
| 7,671,932 B2 | * | 3/2010 | Ohta et al. | 349/55 |
| 8,119,054 B2 | * | 2/2012 | Ito et al. | 264/319 |
| 2007/0087458 A1 | * | 4/2007 | Tanaka et al. | 438/22 |

* cited by examiner

*Primary Examiner* — Jennifer Doan
(74) *Attorney, Agent, or Firm* — Harness, Dickey & Pierce, P.L.C.

(57) ABSTRACT

When a defective pixel causing light leakage is detected in a flat display panel, an optical modulation region is formed in a substrate by emitting a laser beam such that a virtual image is displayed at a position corresponding to the defective pixel. Accordingly, quality of the flat display panel may be improved thereby increasing manufacturing process yield.

20 Claims, 15 Drawing Sheets

FLAT DISPLAY PANELS, METHODS AND APPARATUSES TO REPAIR THE SAME

CROSS-REFERENCE TO RELATED APPLICATION(S)

This application claims priority under 35 U.S.C. §119 to Korean Patent Application No. 2009-0029225, filed on Apr. 6, 2009 in the Korean Intellectual Property Office, the entire contents of which is incorporated herein by reference.

BACKGROUND

1. Field

Example embodiments relate to flat display panels capable of suppressing light leakage caused by one or more defective pixels, and apparatuses and methods to repair flat display panels.

2. Description of the Related Art

During manufacturing of a conventional panel of a flat panel display (referred to as a flat display panel), foreign substances including dust, organic matters and/or metal may attach to the panel. When such foreign substances attach near a liquid crystal or color filter, a bright dot defect is generated. A bright dot defect causes light leakage and results in a defective pixel. More specifically, a defective pixel with a bright dot defect emits brighter light than non-defective pixels during driving of the panel.

Upon detection of a defective pixel, the flat display panel is classified as a defective panel. Such generation of a defective panel deteriorates yield of manufacturing processes.

Conventionally, a defective pixel with a bright dot defect is darkening-processed so as not to be recognized by human eyes. More specifically, for example, the defective panel is processed to a non-defective product through darkening because human eyes are less sensitive to a dark dot defect, which is constantly shown dark, than to a bright dot defect, which is shown even brighter.

However, liquid crystals and color filters of conventional flat display panels are relatively thin, which restricts an area capable of being darkening-processed. Consequently, light emitted from a backlight unit may be imperfectly blocked in spite of the darkening resulting in continued light leakage through the defective pixel.

SUMMARY

Example embodiments provide panels of flat panel displays (referred to as flat display panels) capable of suppressing light leakage by adjusting a path of light incident on the flat display panel.

Example embodiments also provide apparatuses and methods to repair flat display panels.

At least one example embodiment provides a flat display panel capable of improving manufacturing process yield by repairing one or more defective pixels of the flat display panel. At least some other example embodiments provide apparatuses and methods to repair flat display panels having one or more defective pixels.

Additional description of example embodiments will be set forth in part herein, and in part, will be obvious from the description, or may be learned by practice of inventive concepts.

At least one example embodiment provides a flat display panel. The flat display panel includes a plurality of substrates facing each other with a liquid crystal interposed there between. The liquid crystal includes at least one non-defective pixel and at least one defective pixel. The flat display panel further includes an optical modulation region formed within the substrates to at least partially redirect light corresponding to the at least one non-defective pixel.

According to at least some example embodiments, the optical modulation region may be configured to at least partially change a light path. For example, the optical modulation region may be configured to split the incident light such that a portion of the incident light is directed in a direction corresponding to the at least one defective pixel.

According to at least some example embodiments, the plurality of substrates may include: a first substrate configured to display an image; and a second substrate configured to guide light incident on the flat display panel. The first substrate may include first and second diffraction regions disposed diagonally with respect to each other. The first diffraction region may diffract a portion of the incident light toward the second diffraction region, and the second diffraction region may project the light diffracted by the first diffraction region toward a portion of the first substrate corresponding to the at least one defective pixel to form a virtual image in the portion of the first substrate corresponding to the at least one defective pixel.

The second substrate may include: a third diffraction region; and a fourth diffraction region. The third diffraction region may be configured to totally diffract the light incident on the at least one defective pixel toward the fourth diffraction region, and the fourth diffraction region may project the light diffracted by the third diffraction region toward the first diffraction region.

According to at least some example embodiments, the first substrate may further include a third diffraction region disposed diagonally relative to the second diffraction region. The third diffraction region may be configured to diffract a portion of incident light toward the second diffraction region. The second diffraction region may project the light diffracted by the first and the third diffraction regions toward the portion of the first substrate corresponding to the at least one defective pixel to form the virtual image in the portion of the first substrate corresponding to the at least one defective pixel.

According to at least some example embodiments, the second substrate may include: fourth, fifth and sixths diffraction regions. The fourth diffraction region may be configured to totally diffract incident light toward the fifth and sixth diffraction regions. The fifth diffraction region may be configured to project the light diffracted by the fourth diffraction region toward the first diffraction region, and the sixth diffraction region may be configured to project the light diffracted by the fourth diffraction region toward the third diffraction region.

The optical modulation region may be formed as a glass layer coating the substrate. The optical modulation region may include a waveguide, a mirror, a hologram or the like. In addition, or alternatively, the optical modulation region may have a lattice structure.

According to at least some example embodiments, the flat display panel may further include a light blocking region. The light blocking region may be formed in the substrate to interrupt light incident on the defective pixel. The optical modulation region may be formed by emitting a laser beam.

According to at least some example embodiments, the plurality of substrates may include a first substrate and a second substrate. The first substrate displays an image, and the second substrate guides the incident light. The first substrate may include first and second diffraction regions disposed diagonally with respect to each other to project the incident light in a first direction (e.g., forward). In one example, the first diffraction region diffracts part of the incident light toward the second diffraction region, and the second diffraction region projects or redirects the diffracted light forward, thereby forming a virtual image.

The second substrate may include third and fourth diffraction regions formed therein to divert the light incident on the defective pixel in one direction. In this example, the third diffraction region diffracts (e.g., totally or completely diffracts) the light, whereas the fourth diffraction region projects or redirects the diffracted light forward.

The first substrate may include a fifth diffraction region disposed diagonally to the second diffraction region to diffract part of the incident light toward the second diffraction region. The fifth diffraction region may project or redirect forward the light diffracted by the first and the second diffraction regions.

The second substrate may include fourth, sixth and seventh diffraction regions formed therein to divert the light incident on the defective pixel in both directions. In this example, the sixth diffraction region diffracts the incident light (e.g., completely) in both directions while the fourth diffraction region projects part of the light diffracted by the sixth diffraction region toward the first diffraction region. The seventh diffraction region projects part of the light diffracted by the sixth diffraction region toward the fifth diffraction region.

At least one other example embodiment provides an apparatus to repair a flat display panel including a plurality of substrates facing each other with a liquid crystal interposed there between. The apparatus includes a laser source and an optical unit configured to form an optical modulation region in at least one of the plurality of substrates by emitting a laser beam from the laser source to the at least one of the plurality of substrates.

According to at least some example embodiments, the optical unit may further form a light blocking region in the substrate. The light blocking region interrupts light incident on a defective pixel. The laser source may emit a femto-second laser or pico-second laser, and the optical unit may emit the laser onto the substrate, thereby forming the optical modulation unit at a part of the substrate. The optical modulation region may include at least one of a waveguide, a mirror, a hologram, a lattice-structure diffraction region, or the like.

At least one other example embodiment provides a method for repairing a flat display panel including a plurality of substrates facing each other, and a liquid crystal injected between the plurality of substrates. A defective pixel of the flat display panel is detected, and an optical modulation region is formed in at least one of the plurality of substrates. The optical modulation region is configured to at least partially redirect light corresponding to a non-defective pixel if the defective pixel is detected.

According to at least some example embodiments, a light blocking region formed in the substrate may interrupt light incident on the defective pixel. The optical modulation region may include at least one of a waveguide, a mirror, a hologram, a lattice-structure diffraction region or the like.

BRIEF DESCRIPTION OF THE DRAWINGS

Example embodiments will become more apparent and readily appreciated from the following description of the accompanying drawings in which.

DETAILED DESCRIPTION

Figure 1A:
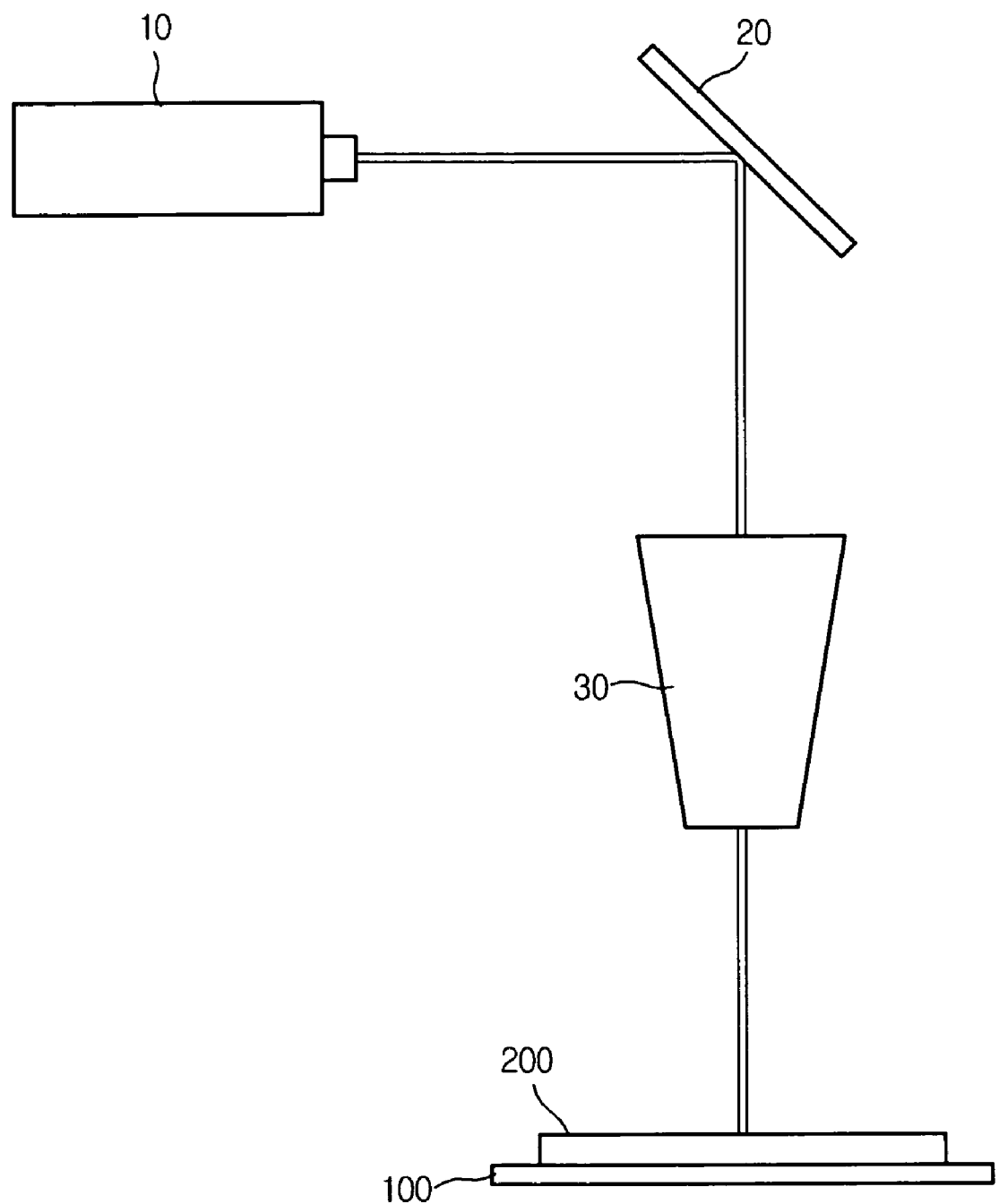
FIG. 1A is a view showing the structure of an apparatus to repair a flat display panel according to an example embodiment.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Inventive concepts may, however, may be embodied in many alternate forms and should not be construed as limited to only the example embodiments set forth herein.

It should be understood, however, that there is no intent to limit inventive concepts to the particular example embodiments disclosed, but on the contrary example embodiments are to cover all modifications, equivalents, and alternatives. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1A shows the structure of an apparatus to repair a flat display panel according to an example embodiment.

Referring to FIG. 1A, a laser beam emitted from a laser source 10 is reflected toward an optical unit 30 by a reflection mirror 20. In this example, the laser source 10 may be a femto-second laser, a pico-second laser or similar laser having relatively high energy density and a relatively low depth of focus. The laser source 10 may be capable of processing only a desired part or portion within a glass substrate. In this case, the laser does not affect the surroundings.

The optical unit 30 optically processes the laser beam emitted from the laser source 10 (e.g., incident light) and emits the processed incident light toward a panel of a flat panel display (referred to herein as a flat display panel) 200 arranged on a stage 100. In this example, the optical processing may include: conversion of a light path, splitting of light, adjustment of intensity and focus of light, etc. The optical unit 30 may perform some or all of the above optical processes and include optical parts such as a reflection mirror and/or a laser diode.

During manufacturing of the flat display panel 200, a bright dot defect may be detected using inspection equipment in a state where liquid crystal is injected into the panel. When a defective pixel is detected, the panel 200 may be placed on the stage 100 using a carriage and repaired using the panel repairing apparatus shown in FIG. 1.

Figure 1B:
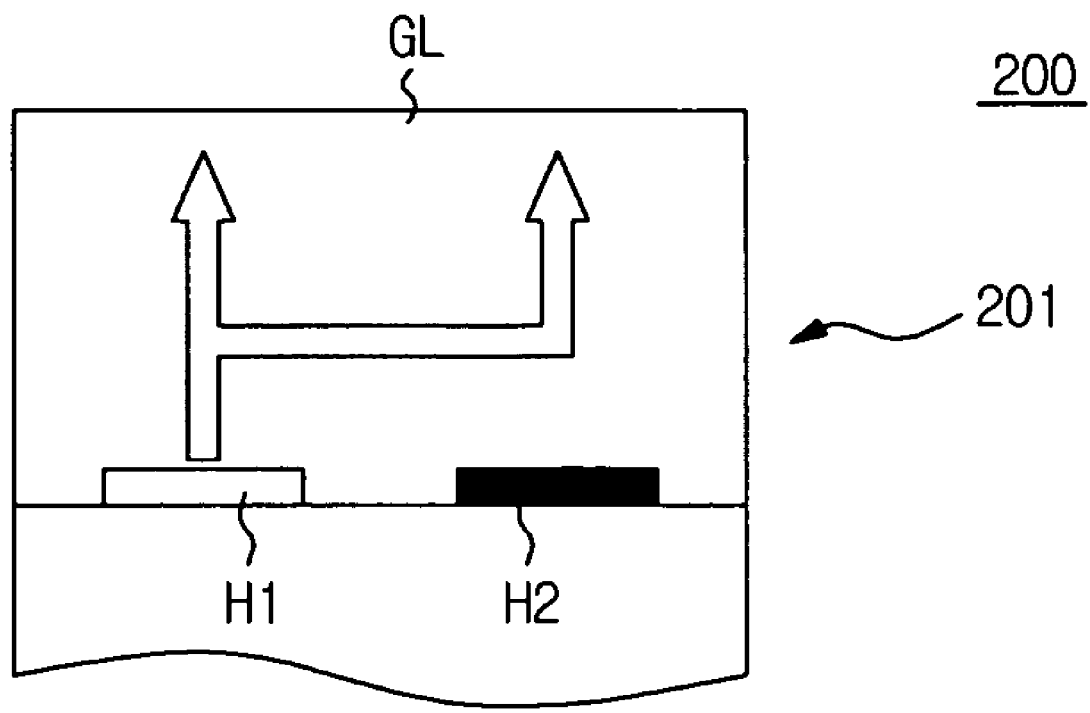
FIG. 1B is a view explaining an example operation of splitting light corresponding to a non-defective pixel into a defective pixel region according to an example embodiment.

As shown in FIG. 1B, an optical modulation region to change a light path is formed as a glass layer GL coating an upper part of the substrate 201. If a non-defective pixel H1 and a defective pixel H2 are disposed adjacent to each other within the substrate 201 of the panel 200, the light corresponding to the non-defective pixel H1 is partially split and the split part is redirected toward a position corresponding to the defective pixel H2, thereby displaying a virtual image on an outer surface.

Hereinafter, example embodiments of methods to repair a flat display panel including a defective pixel will be explained in more detail.

Figure 2A:
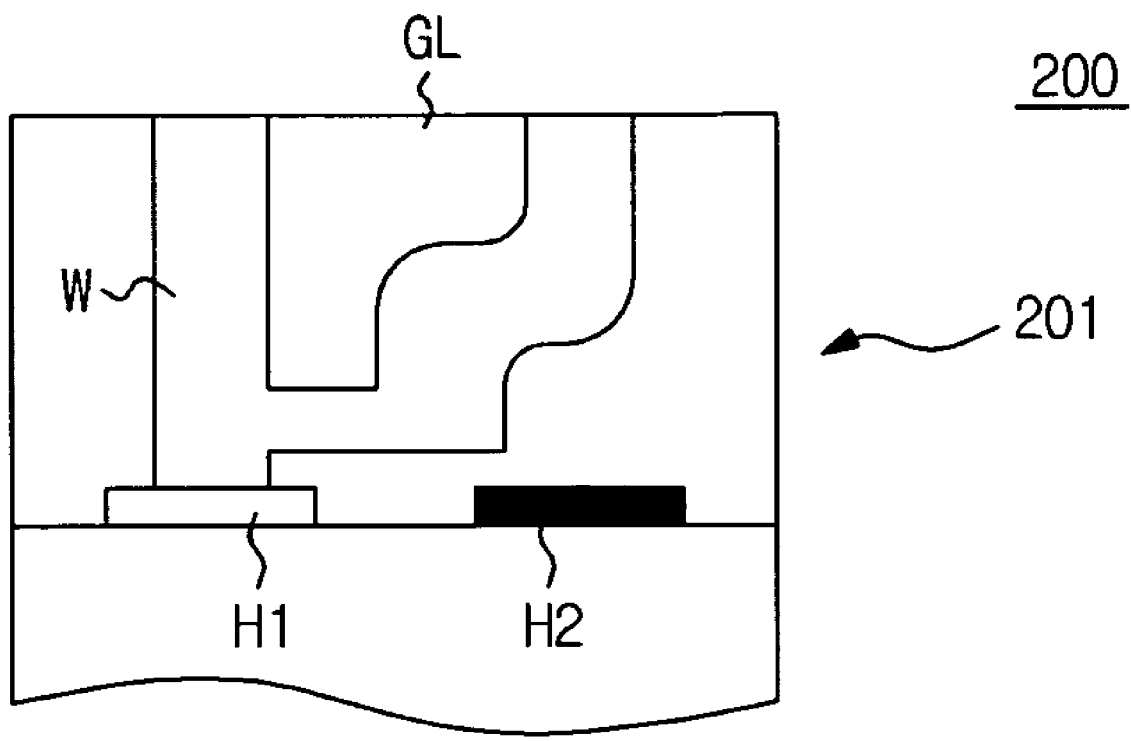
FIG. 2A is a view showing an inner structure of a flat display panel according to an example embodiment.

FIG. 2A shows a panel repairing method according to an example embodiment. In the example embodiment shown in FIG. 2A a light path is changed using a waveguide W formed in the substrate 201. The waveguide W may be prepared by emitting a laser beam toward the glass layer GL thereby varying refractivity of a desired region of the glass layer GL. The waveguide W splits and guides the light in multiple (e.g., two) directions. The portion of the light emitted from the non-defective pixel H1 is projected in a first direction (e.g., forward) while another portion of the light is split and bent (redirected) in a second direction. Accordingly, the light passing through the non-defective pixel H1 is projected forward and a split part of the light is concurrently or simultaneously projected to a region corresponding to the defective pixel H2.

Figure 2B:
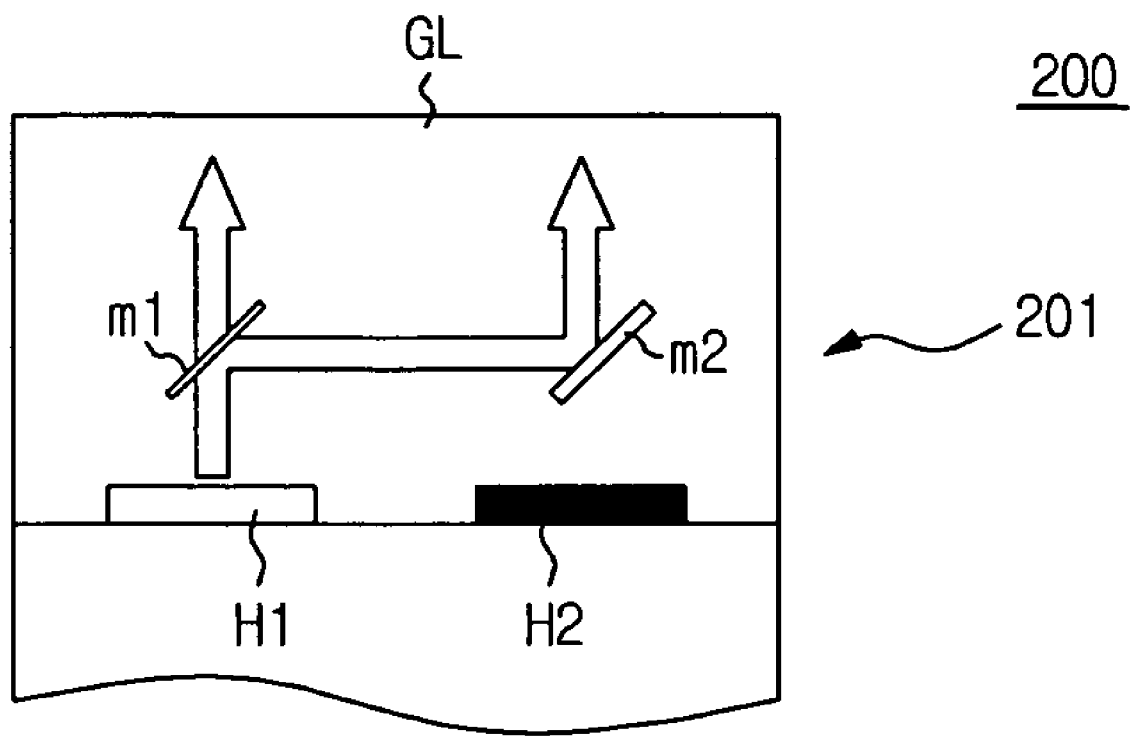
FIG. 2B is a view showing an inner structure of a flat display panel according to another example embodiment.

FIG. 2B shows a panel repairing method according to another example embodiment. In the example embodiment shown in FIG. 2B a light path is changed using a mirror provided in the substrate 201. As shown, a half mirror m1 and a reflection mirror m2 are formed in the glass substrate GL.

The half mirror m1 partially reflects incident light and the reflection mirror m2 reflects (e.g., totally reflects) incident light. The half mirror m1 and the reflection mirror m2 may be formed of a plate of which refractivity is modulated. According to at least this example embodiment, while the light passing through the non-defective pixel H1 is projected in a first direction (e.g., forward), a portion of the light is reflected and projected toward the region corresponding to the defective pixel H2.

Figure 2C:
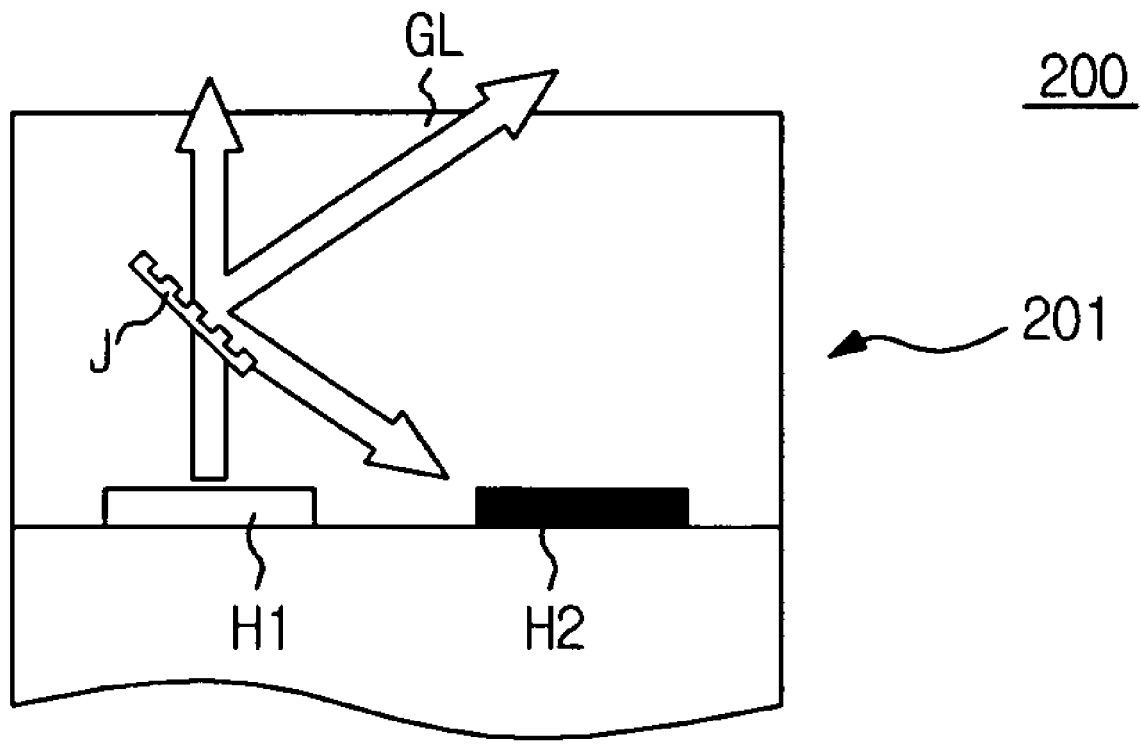
FIG. 2C is a view showing an inner structure of a flat display panel according to yet another example embodiment.

FIG. 2C shows a panel repairing method according to yet another example embodiment. The panel repairing method shown in FIG. 2C changes a light path using a diffraction region provided in the substrate 201. At least two laser beams are emitted toward the glass layer GL to incur interference by the laser beams thereby forming a diffraction region J at a certain portion. The diffraction region J has a lattice structure to diffract the incident light in a plurality of directions. The diffracted light is projected toward regions of the non-defective pixel H1 and the defective pixel H2. Various example embodiments of splitting light using such a diffraction region will be explained in more detail with reference to FIGS. 3 through 10.

Figure 2D:
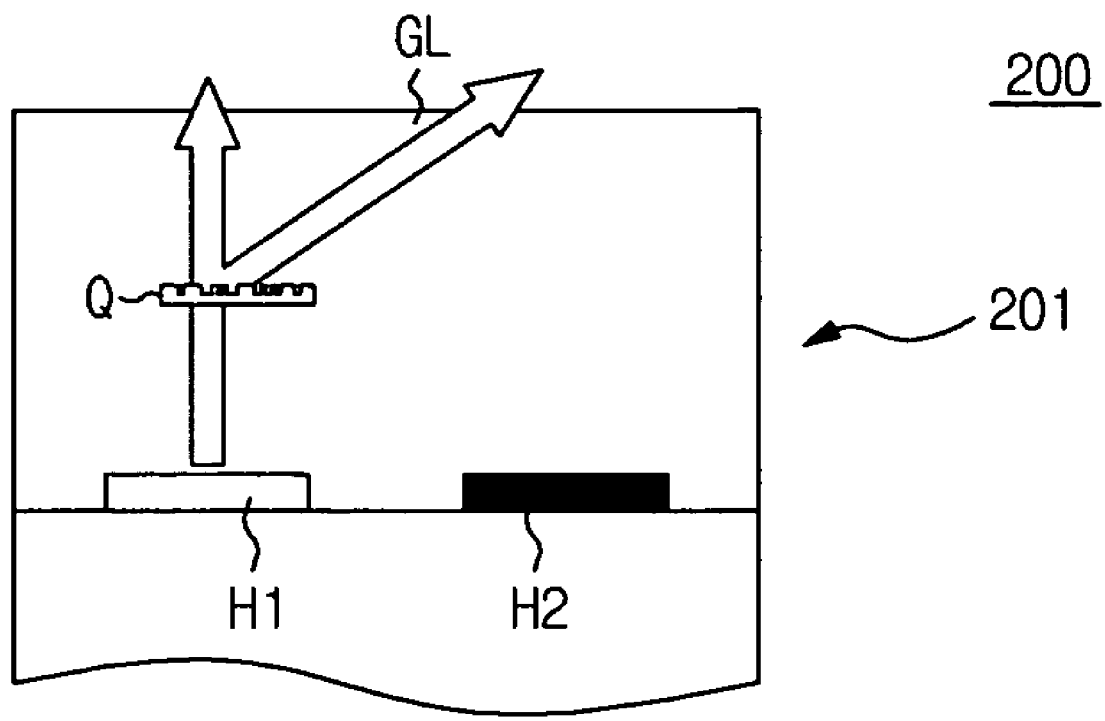
FIG. 2D is a view showing an inner structure of a flat display panel according to still another example embodiment.

FIG. 2D shows a panel repairing method according to still another example embodiment. The panel repairing method shown in FIG. 2D changes a light path using a hologram provided in the substrate 201.

Referring to FIG. 2D, a hologram Q may be formed by emitting a laser beam toward the glass layer GL. The hologram Q diffracts incident light in a desired direction. More specifically, for example, the hologram Q transmits incident light in accordance with pattern images recorded by the laser beam, and concurrently or simultaneously diffracts part of the incident light in another direction. Accordingly, while the light passing through the non-defective pixel H1 is projected in a first direction (e.g., forward), a part of the light is reflected and projected (redirected) to the region corresponding to the defective pixel H2.

According to at least some example embodiments, the optical modulation region to split light is formed at the glass layer GL of the substrate 201, and light corresponding to the non-defective pixel is split by the optical modulation region so that the split part of the light is projected (redirected) toward the defective pixel region. Because methods described herein have different environments for laser beam processing, costs, and processing times, any of the methods may be selectively adopted according to use. Methods using the diffraction region have a relatively simple structure and relatively low cost. Hereinafter, various example embodiments of methods to suppress and/or prevent light leakage caused by the defective pixel using the diffraction region will be explained in more detail.

Figure 3:
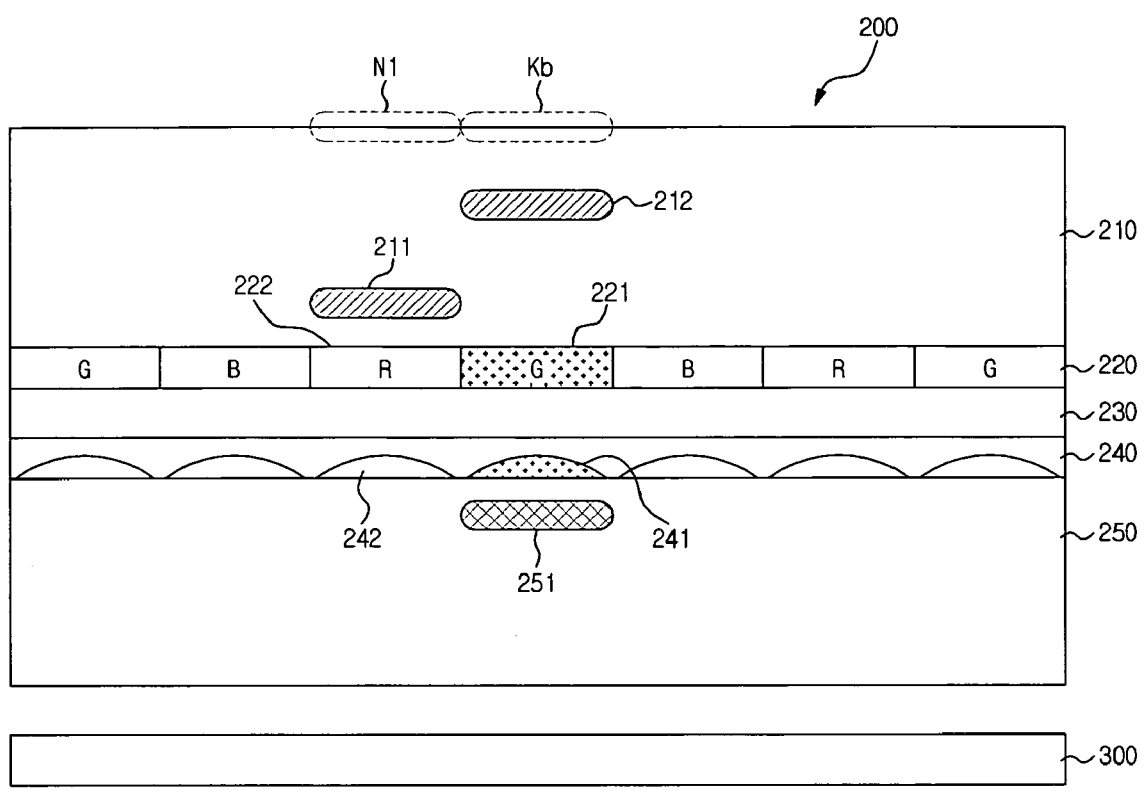
FIG. 3 is a view showing an example arrangement of a flat display panel and a backlight unit according to an example embodiment.

FIG. 3 shows an example arrangement of a flat display panel and backlight unit according to an example embodiment.

Referring to FIG. 3, a backlight unit 300 is disposed at one side of the flat display panel 200. When the panel 200 is driven, light is emitted from the backlight unit 300 into the panel 200. The emitted light is transmitted from a lower part to an upper part of the panel 200, thereby producing images corresponding to respective pixels on the substrate.

The panel 200 includes a first substrate 210 disposed at an upper part to display an image, and a second substrate 250 disposed at a lower part to guide the light from the backlight unit 300. A liquid crystal layer 230 is injected between the first and the second substrates 210 and 250. Additionally, the first and the second substrates 210 and 250 are coated with a glass layer.

A color filter layer 220 is formed between the first substrate 210 and the liquid crystal layer 230. The color filter layer 220 includes a plurality of color filters. Each of the plurality of filters of the color filter layer 220 corresponds to a respective pixel.

A pixel electrode layer 240 is formed between the second substrate 250 and the liquid crystal layer 230. The pixel electrode layer 240 includes a plurality of pixel electrodes. Each of the plurality of pixel electrodes of the pixel electrode layer 240 corresponds to a respective pixel.

As noted above, foreign substances may attach to the liquid crystal layer 230, the color filter layer 220 and/or the pixel electrode layer 240 during manufacturing of the panel, thereby causing a defective pixel.

In the example embodiment shown in FIG. 3, a defective pixel is generated at the color filter 221 and the pixel electrode 241. If either of the color filter 221 and the pixel electrode 241 is defective, the corresponding pixel is considered a defective pixel. In this example, the image is not normally displayed on the panel 200 through a defective color filter 221 and/or a defective pixel electrode 241.

Still referring to FIG. 3, a plurality of diffraction regions 211 and 212 are formed in the first substrate 210 and a light blocking region 251 is formed in the second substrate 250. The plurality of diffraction regions 211 and 212 are formed to correspond to the normal color filter 222 and the defective color filter 221, respectively. The light blocking region 251 is formed to correspond to the defective pixel electrode 241.

In this example, when the plurality of diffraction regions 211 and 212 and the light blocking region 251 are formed, the optical unit 30 is operated so that the laser beam emitted from the laser source 10 is projected on desired positions of the substrates 210 and 250. The laser projection positions may be determined by a computer control program based on positions of the defective pixels detected by inspection equipment (not shown).

In this example, the light blocking region 251 interrupts the light emitted from the backlight unit 300 from entering the defective pixel so that the defective pixel does not form an image corresponding to the defective pixel. Nevertheless, the plurality of diffraction regions 211 and 212 diffract part of the incident light by changing the light path and thereby generating a virtual image.

Figure 4:
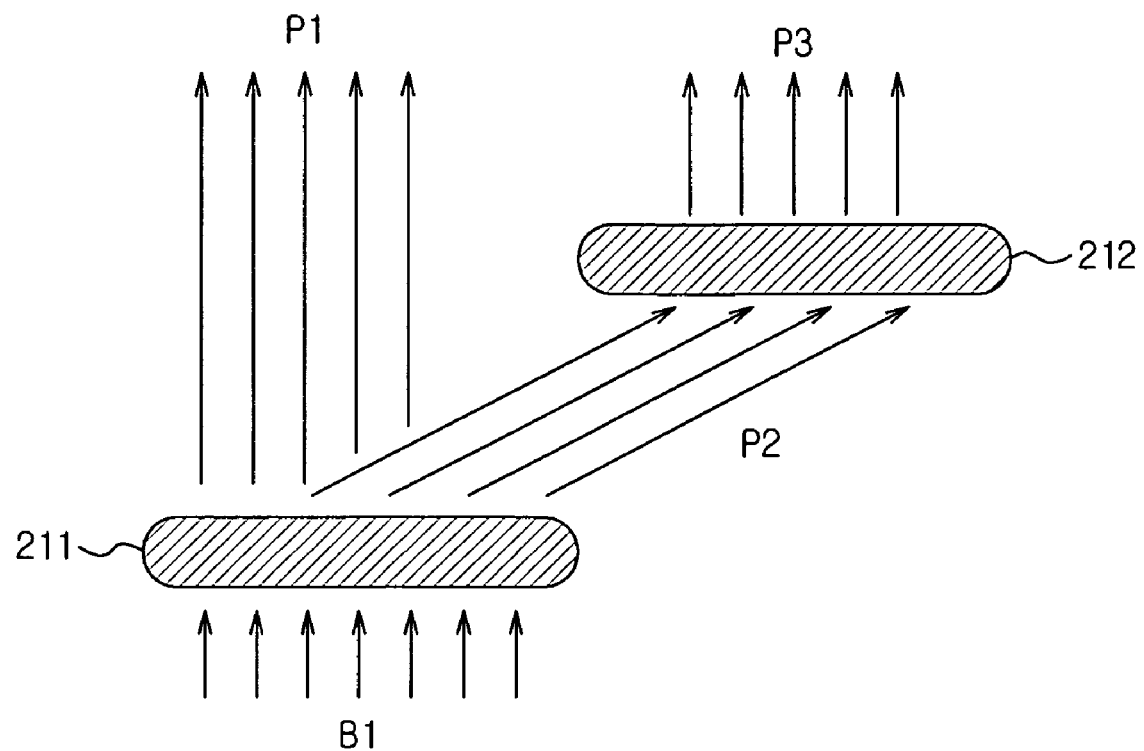
FIG. 4 is a view explaining an example light path changed by the diffraction regions shown in FIG. 3.

As shown in FIG. 4, the first diffraction region 211 projects the incident light B1 passing through the liquid crystal layer 230 and the color filter layer 220 in a first direction (e.g., forward) such that a normal image N1 (shown in FIG. 3) of corresponding pixels is displayed by light P1. Furthermore, as shown in FIG. 4, the first diffraction region 211 diffracts part of the incident light B1 so that the diffracted light P2 is supplied to the second diffraction region 212 disposed at a diagonal position. The second diffraction region 212 projects the diffracted light in the first direction (e.g., forward). Therefore, a virtual image Kb, which is different from the actual image, is produced on the surface of the first substrate 210 by the projected light P3. The virtual image Kb is similar to adjacent images generated by the non-defective pixels. And, although being different from the actual image, the virtual image Kb may be perceived by human eyes more naturally than the conventional dark dot defect, which is constantly shown dark by the darkening process.

Figure 5:
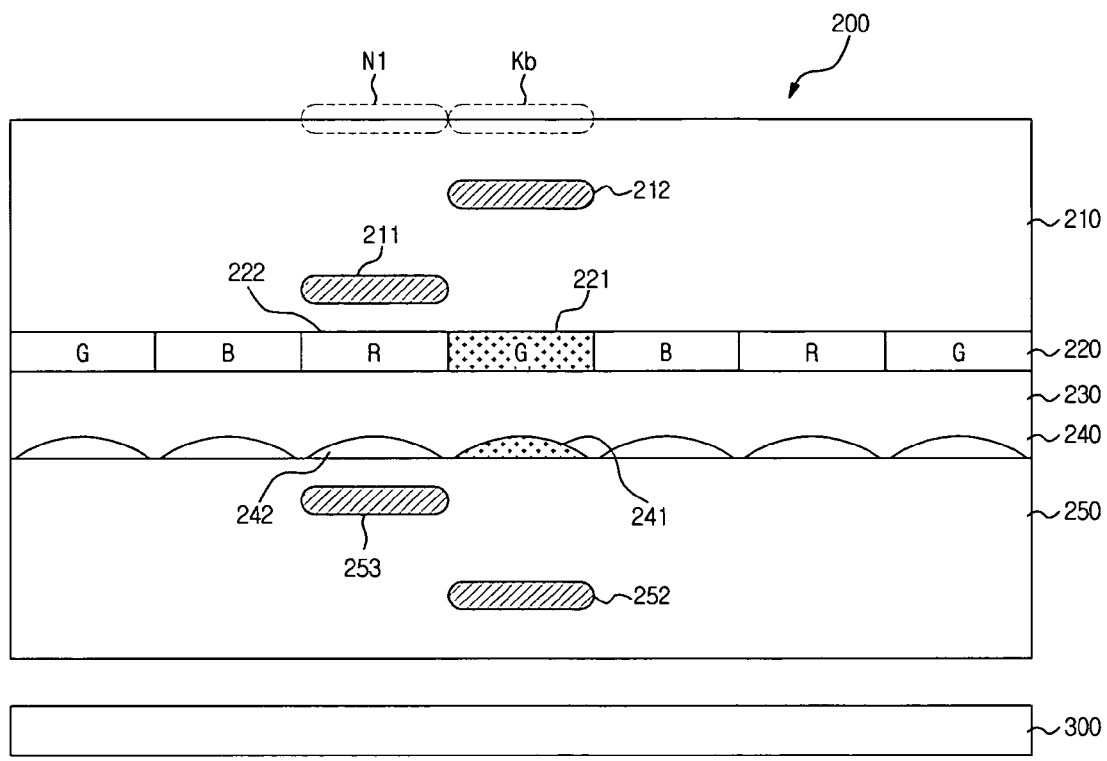
FIG. 5 is a view showing an example arrangement of a flat display panel and a backlight unit according to an example embodiment.
Figure 6:
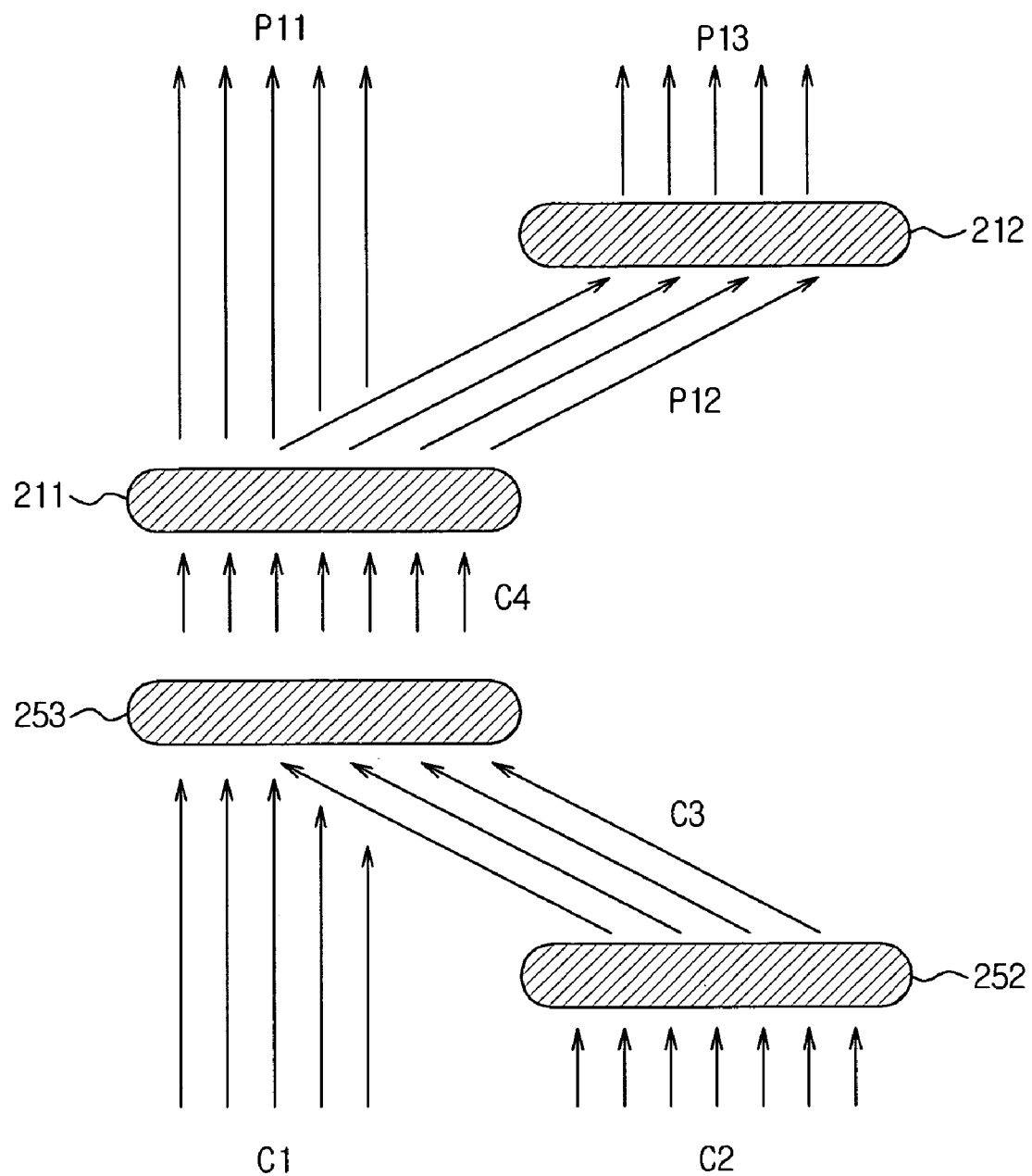
FIG. 6 is a view explaining an example light path changed by the diffraction regions of FIG. 5.

FIG. 5 shows an arrangement of a flat display panel and a backlight unit according to another example embodiment. FIG. 6 shows example operation of the flat display panel shown in FIG. 5. The flat display panel shown in FIG. 5 is similar to the example embodiment shown in FIG. 3, but includes a modified version of the diffraction region. In the description related to FIG. 5, the same reference numerals as FIG. 3 are considered as the same functional elements and will be explained only briefly.

Referring to FIG. 5, a plurality of diffraction regions 252 and 253 are formed on or within the second substrate 250. The plurality of diffraction regions 252 and 253 are configured to divert the light incident on the defective pixel in a first direction.

Referring to FIG. 6, a third diffraction region 252 diffracts light C2 projected from the backlight unit 300 toward a fourth diffraction region 253 disposed at a diagonal position such that diffracted light C3 is incident on the fourth diffraction region 253.

The fourth diffraction region 253 collectively projects the light C1 directly incident from the backlight unit 300 and the diffracted light C3 in a first direction (e.g., forward). The collectively forwarded light C4 passes through the liquid crystal layer 230 and the color filter 220 (shown in FIG. 5) and is guided toward the first diffraction region 211. The first diffraction region 211 partially projects forward and partially diffracts the incident light. The light P11 projected forward by the first diffraction region 211 forms the normal image N1 (shown in FIG. 5) on the surface of the first substrate 210. The light P12 diffracted by the first diffraction region 211 is projected in the first direction (e.g., forward) by the second diffraction region 212, and the projected light P13 forms the virtual image Kb on the surface of the first substrate 210. Although the virtual image Kb is different from the desired actual image, human eyes may perceive the virtual image Kb more naturally than the conventional dark dot defect.

Figure 7:
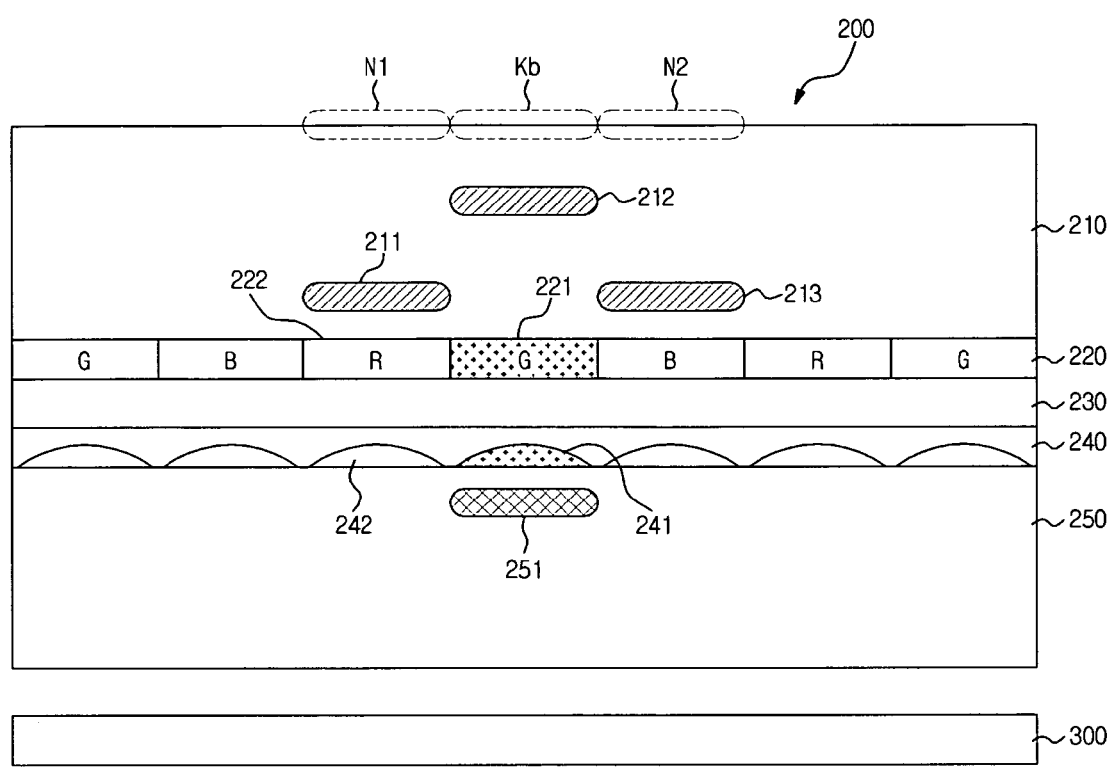
FIG. 7 is a view showing an example arrangement of a flat display panel and backlight unit according to an example embodiment.
Figure 8:
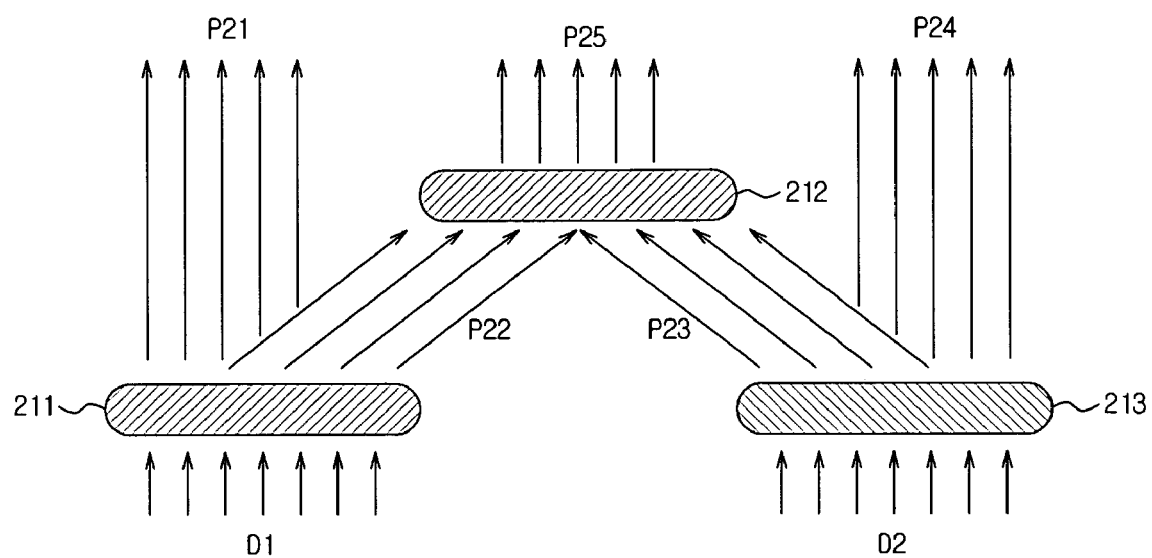
FIG. 8 is a view explaining an example light path changed by the diffraction regions of FIG. 7.

FIG. 7 shows an arrangement of a flat display panel and a backlight unit according to yet another example embodiment. The example embodiment shown in FIG. 7 is similar to the example embodiment shown in FIG. 3, but includes another modified version of the diffraction region. In the following description related to FIG. 7, the same reference numerals as FIG. 3 are considered to be the same functional elements and will be explained briefly. FIG. 8 shows example operation of the example embodiment shown in FIG. 7.

Referring to FIG. 7, a plurality of diffraction regions 211 and 213 are formed at diagonal positions with respect to the second diffraction region 212. In addition, a light blocking region 251 is formed in the second substrate 250 to interrupt the light incident on the defective pixel.

Referring to FIG. 8, the first diffraction region 211 projects incident light D1 forward while diffracting part of the incident light D1. The light P21 projected forward enables the normal image N1 of corresponding pixels to be displayed on the surface of the first substrate 210. In the same or substantially the same manner, a fifth diffraction region 213 projects incident light D2 forward while diffracting part of the incident light D2. The forward projected light P24 enables a second normal image N2 to be displayed on the surface of the first substrate 210.

The second diffraction region 212 is disposed at a diagonal position with respect to both the first and the fifth diffraction regions 211 and 213. The second diffraction region 212 projects diffracted light P22 and P23 from the first and the fifth diffraction regions 211 and 213 collectively in the first direction (e.g., forward) to generate virtual image Kb. The virtual image Kb is similar, but different from the actual image. Further, the virtual image Kb is displayed by the collectively forwarded light P25 on the surface of the first substrate 210. Because the virtual image Kb is similar to adjacent images generated by the normal pixels, human eyes perceive the virtual image Kb more naturally than the conventional dark dot defect.

Figure 9:
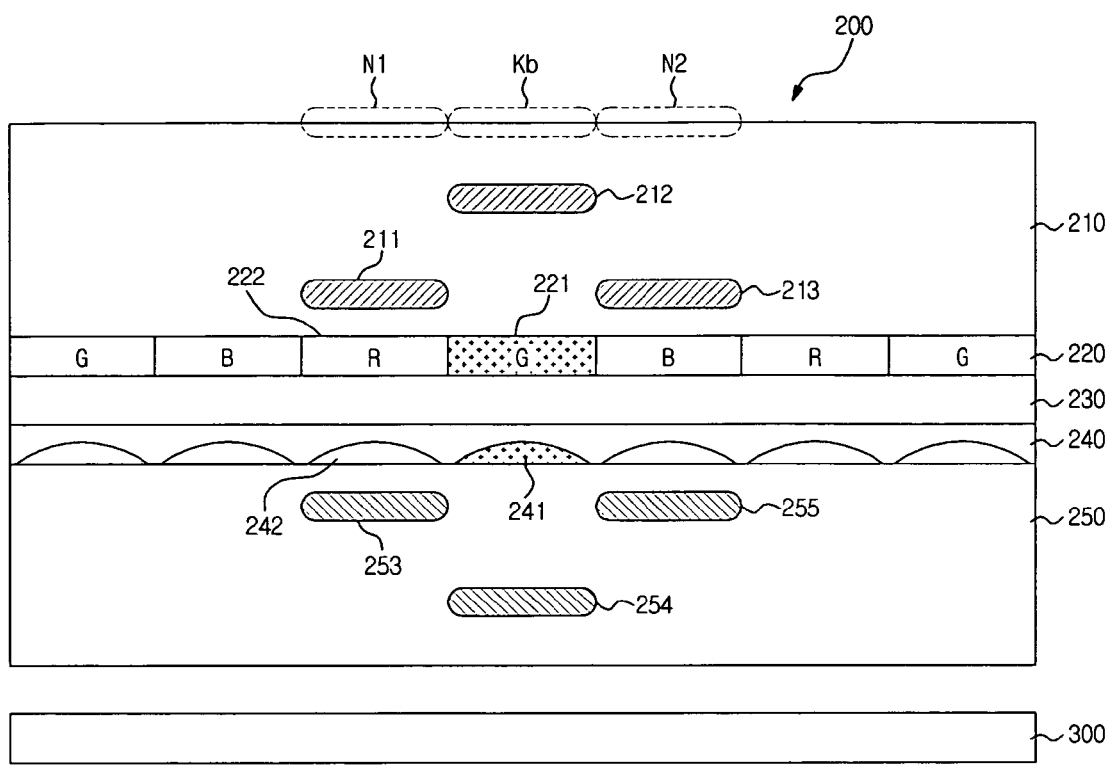
FIG. 9 is a view showing an example arrangement of a flat display panel and backlight unit according to another example embodiment.
Figure 10:
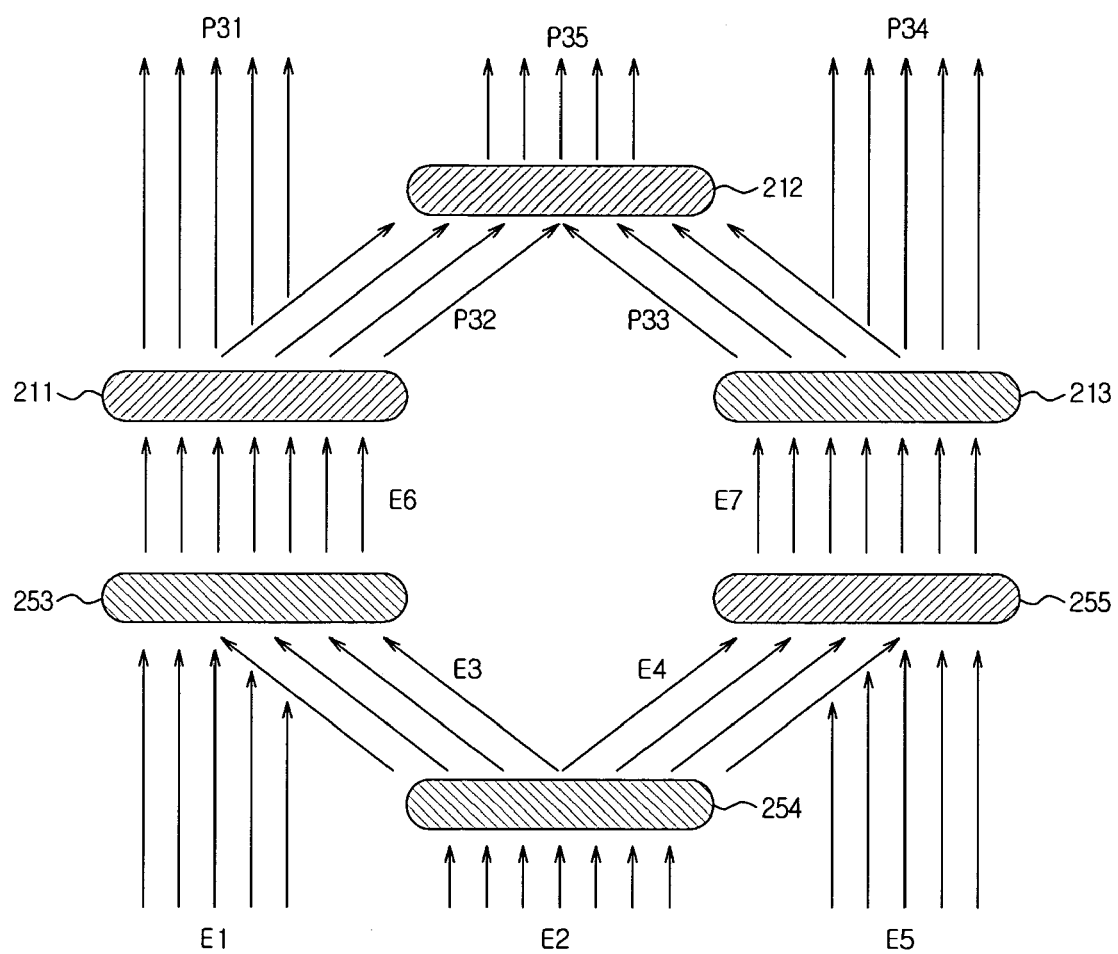
FIG. 10 is a view explaining an example light path changed by the diffraction regions of FIG. 9.

FIG. 9 shows an arrangement of a flat display panel and backlight unit according to yet another example embodiment. The flat display panel is similar to the example embodiments described above, but includes another modified version of the diffraction region. In the description related to FIG. 9, the same reference numerals are considered as the same functional elements described in the above-described example embodiments and therefore will be explained only briefly. FIG. 10 shows example operation of the example embodiment shown in FIG. 9.

Referring to FIG. 9, a plurality of diffraction regions 253, 254 and 255 are formed on or within the second substrate 250 to divert light incident on the defective pixel in both directions.

Referring to FIG. 10, a sixth diffraction region 254 diffracts incident light E2 projected from the backlight unit 300 toward the fourth and a seventh diffraction regions 253 and 255 disposed at diagonal positions. The diffracted light E3 is diffracted toward the fourth diffraction region 253, whereas diffracted light E4 is diffracted toward the seventh diffraction region 255.

The fourth diffraction region 253 projects directly incident light E1 from the backlight unit 300 and the diffracted light E3 collectively forward through the liquid crystal layer 230 and the color filter 220 toward the first diffraction region 211. The first diffraction region 211 partially projects forward and partially diffracts the incident light. The forward projected light P31 forms the normal image N1 on the surface of the first substrate 210.

The seventh diffraction region 255 projects directly incident light E5 from the backlight unit 300 and the diffracted light E4 collectively forward through the liquid crystal layer 230 and the color filter 220 to the fifth diffraction region 213. The fifth diffraction region 213 partially projects forward and partially diffracts the incident light. The forward projected light P34 forms the normal image N2 on the surface of the first substrate 210.

The second diffraction region 212 projects diffracted light P32 and diffracted light P33 collectively forward, and the collectively forwarded light P35 forms the virtual image Kb on the surface of the first substrate 210. Although being different from the actual image, the virtual image Kb is similar to adjacent actual images implemented by the normal pixels. Accordingly, the virtual image Kb is recognized by human eyes more naturally than the conventional dark dot defect.

Hereinafter, a method to repair the flat display panel according to an example embodiment will be described with reference to FIG. 11.

A circuit pattern is configured by arranging a semiconductor layer, as an electrode corresponding to the pixels, and a signal line using a semiconductor technology.

Figure 11:
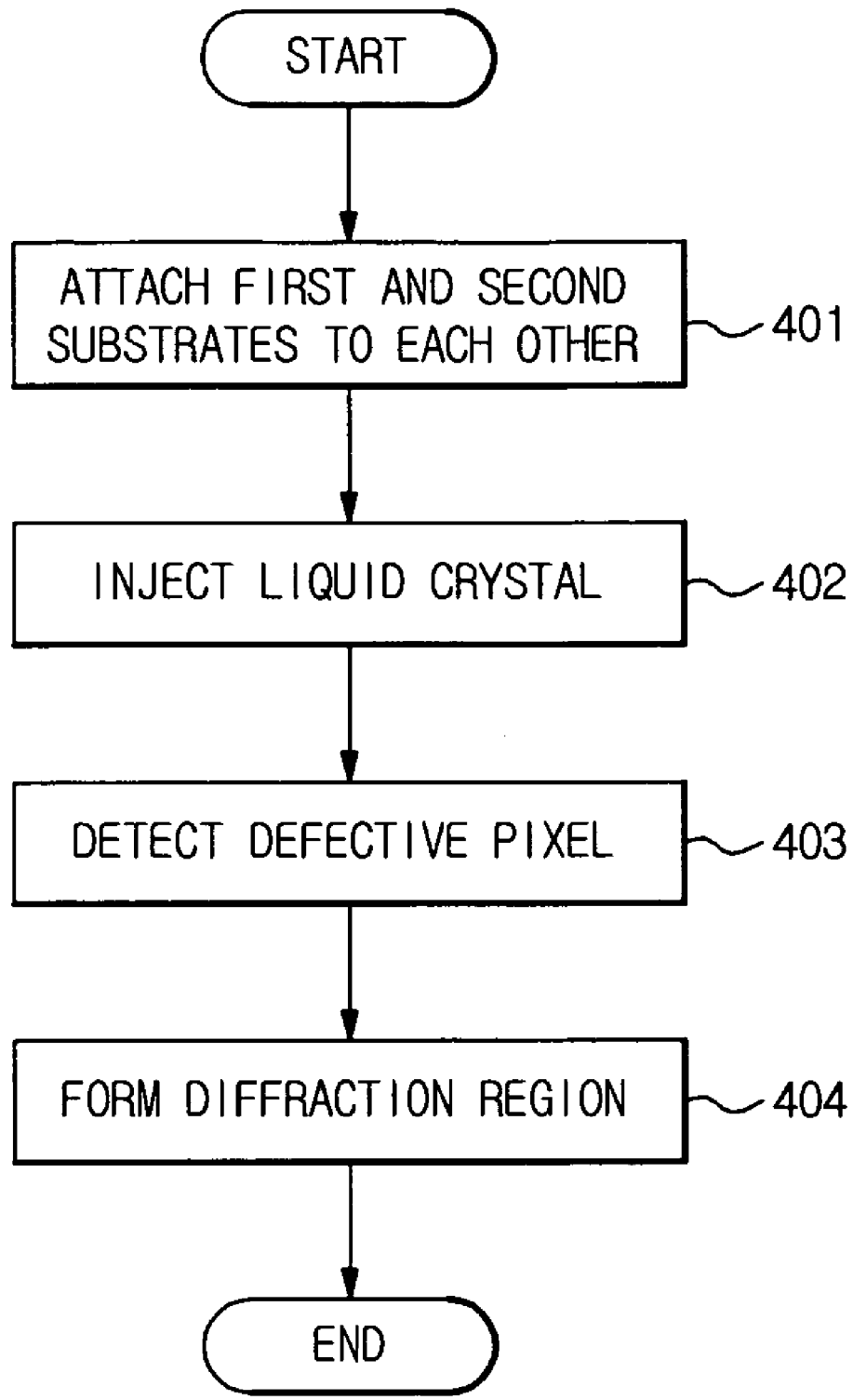
FIG. 11 is a flowchart explaining a method to repair a flat display panel according to an example embodiment.

Referring to FIG. 11, at 401 the manufactured substrates are attached facing each other. At 402, a liquid crystal is injected between the two substrates. At 403, inspection equipment detects whether there is a defective pixel shown even brighter than adjacent normal pixels due to light leakage. At 404, upon detection of a defective pixel, the defective panel 200 is put on a stage 100, and a diffraction region is formed in the substrate of the defective panel 200 using a repairing apparatus according to at least one example embodiment described herein. The diffraction region is provided to at least one of the plurality of substrates disposed at the upper or lower part in the flat display panel.

The diffraction region implements the virtual image on a position corresponding to the defective pixel. Such a virtual image may be perceived more naturally than a dark dot defect. As discussed herein, a light path may be controlled using various example embodiments of methods of forming optical modulation regions.

According to at least some example embodiments, a virtual image may be displayed at a position corresponding to the defective pixel. The virtual image which may be more naturally perceived by human eyes. The virtual image may be displayed by forming an optical modulation region that changes a light path in a substrate of a panel containing a defective pixel generated during manufacturing of the flat display panel.

Furthermore, quality of the defective panel may be improved because light leakage caused by the defective pixel is suppressed and/or prevented. This may increases yield of flat display panel manufacturing processes.

Although only some example embodiments have been shown and described, it will be appreciated by those skilled in the art that changes may be made without departing from the principles and spirit of inventive concepts, the scope of which is defined in the claims and their equivalents.

What is claimed is:

1. A flat display panel comprising:
    a plurality of substrates facing each other;
    a liquid crystal interposed between the plurality of substrates, the liquid crystal including at least one defective pixel and at least one non-defective pixel; and
    an optical modulation region formed within at least one substrate, the optical modulation region being configured to at least partially redirect incident light corresponding to the at least one non-defective pixel.

2. The panel according to claim 1, wherein the optical modulation region is configured to split the incident light such that a portion of the incident light is directed in a direction corresponding to the at least one defective pixel.

3. The panel according to claim 1, wherein the optical modulation region is formed as a glass layer coating the at least one substrate.

4. The panel according to claim 1, wherein the optical modulation region includes a waveguide.

5. The panel according to claim 1, wherein the optical modulation region includes a mirror.

6. The panel according to claim 1, wherein the optical modulation region includes a hologram.

7. The panel according to claim 1, wherein the optical modulation region includes a lattice structure.

8. The panel according to claim 1, further comprising:
a light blocking region formed in at least one of the plurality of substrates, the light blocking region being configured to interrupt light incident on the at least one defective pixel.

9. The panel according to claim 1, wherein the optical modulation region is formed by emitting a laser beam.

10. The panel according to claim 1, wherein the plurality of substrates comprise:
a first substrate configured to display an image; and
a second substrate configured to guide light incident on the flat display panel; wherein
the first substrate includes first and second diffraction regions disposed diagonally with respect to each other,
the first diffraction region diffracts a portion of the incident light toward the second diffraction region, and
the second diffraction region projects the light diffracted by the first diffraction region toward a portion of the first substrate corresponding to the at least one defective pixel to form a virtual image in the portion of the first substrate corresponding to the at least one defective pixel.

11. The panel according to claim 10, wherein the second substrate comprises:
a third diffraction region; and
a fourth diffraction region; wherein
the third diffraction region is configured to totally diffract the light incident on the at least one defective pixel toward the fourth diffraction region, and
the fourth diffraction region projects the light diffracted by the third diffraction region toward the first diffraction region.

12. The panel according to claim 10, wherein the first substrate further comprises:
a third diffraction region disposed diagonally relative to the second diffraction region, the third diffraction region being configured to diffract a portion of incident light toward the second diffraction region, and wherein
the second diffraction region projects the light diffracted by the first and the third diffraction regions toward the portion of the first substrate corresponding to the at least one defective pixel to form the virtual image in the portion of the first substrate corresponding to the at least one defective pixel.

13. The panel according to claim 12, wherein the second substrate comprises:
fourth, fifth and sixths diffraction regions; wherein
the fourth diffraction region is configured to totally diffract incident light toward the fifth and sixth diffraction regions;
the fifth diffraction region is configured to project the light diffracted by the fourth diffraction region toward the first diffraction region, and
the sixth diffraction region is configured to project the light diffracted by the fourth diffraction region toward the third diffraction region.

14. An apparatus to repair a flat display panel including a plurality of substrates facing each other with a liquid crystal layer interposed there between, the apparatus comprising:
a laser source; and
an optical unit configured to form an optical modulation region in at least one of the plurality of substrates by emitting a laser beam from the laser source to at least one of a plurality of substrates of the flat display panel, the optical modulation region configured to at least partially redirect incident light corresponding to at least one non-defective pixel.

15. The apparatus according to claim 14, wherein the optical unit is further configured to form a light blocking region in at least one of the plurality of substrates, the light blocking region being configured to interrupt light incident on a defective pixel of the flat display panel.

16. The apparatus according to claim 14, wherein the laser source is configured to emit one of a femto-second laser and a pico-second laser, and the optical unit is configured to direct the laser onto at least one of the plurality of substrates to form the optical modulation unit at a part of the at least one substrate.

17. The apparatus according to claim 16, wherein the optical modulation region comprises:
at least one of a waveguide, a mirror, a hologram, and a lattice-structure diffraction region.

18. A method for repairing a flat display panel including a plurality of substrates facing each other, and a liquid crystal injected between the plurality of substrates, the method comprising:
detecting a defective pixel of the flat display panel; and
forming an optical modulation region in at least one of the plurality of substrates, the optical modulation region being configured to at least partially redirect light corresponding to a non-defective pixel if the defective pixel is detected.

19. The method according to claim 18, further comprising:
interrupting, by a light blocking region formed in at least one of the plurality of substrates, light incident on the defective pixel.

20. The method according to claim 18, wherein the optical modulation region includes at least one of a waveguide, a mirror, a hologram, and a lattice-structure diffraction region.

* * * * *